E. M. STOUT.
COUPLING.
APPLICATION FILED APR. 21, 1919.
1,336,323.
Patented Apr. 6, 1920.
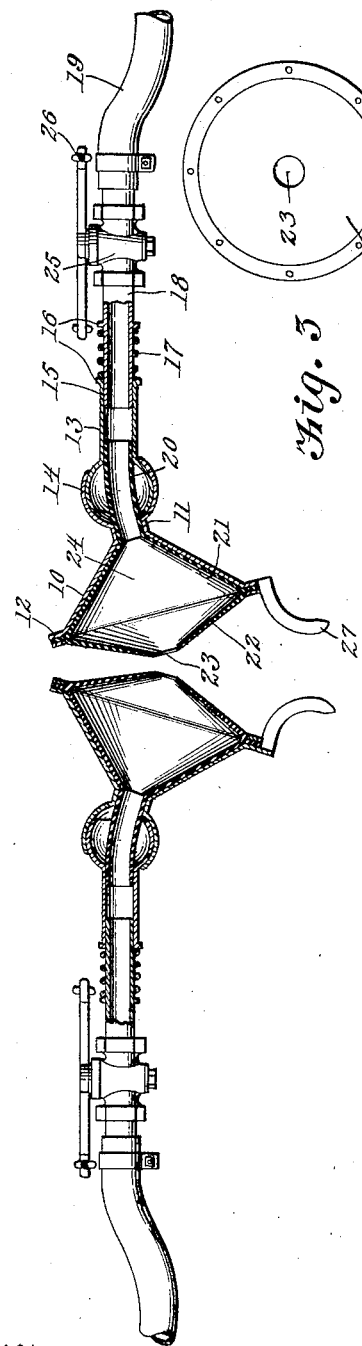
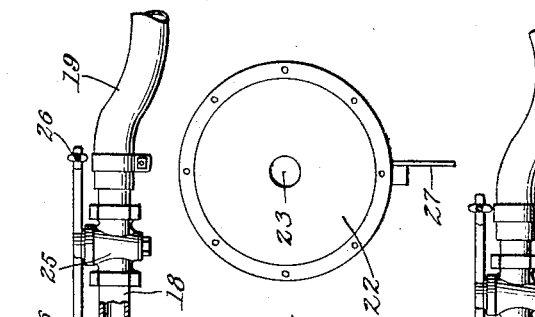
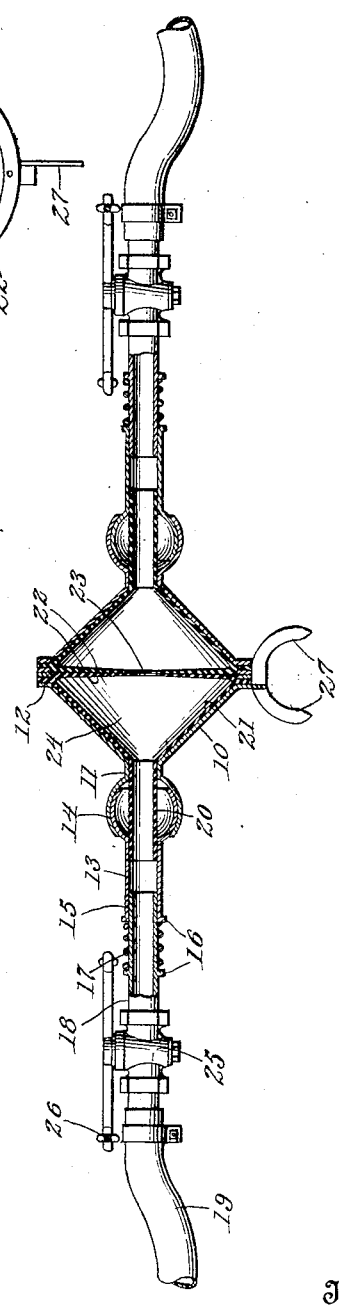
Witnesses
Geo. E. Logan
Inventor
E. M. Stout
By Victor J. Evans
Attorney

UNITED STATES PATENT OFFICE.

ELVIN MACE STOUT, OF NEVIS, MINNESOTA.

COUPLING.

1,336,323.  Specification of Letters Patent.  Patented Apr. 6, 1920.

Application filed April 21, 1919. Serial No. 291,443.

*To all whom it may concern:*

Be it known that I, ELVIN M. STOUT, a citizen of the United States, residing at Nevis, in the county of Hubbard and State of Minnesota, have invented new and useful Improvements in Couplings, of which the following is a specification.

This invention relates to air hose couplings for train lines and has for an object the provision of a coupling in which the air passing through the train line will act to hold the coupling members together in a manner to prevent leakage of air between the said coupling members.

Another object of the invention is to provide a coupling of the above character, which is simple, durable and inexpensive of construction and positive in operation, the action of the air passing through the train line serving to hold the coupling members together to prevent air leakage, while the auxiliary locking device further serves to prevent accidental separation of the coupling members.

With the above and other objects in view, the invention includes a coupling member having an air chamber formed at its outer end with a flexible apertured wall for contact with a similar wall of an opposite coupling member, the said air chamber having valve controlled communication with the air supply, so that an individual coupling may be separated without cutting off the air from the entire train.

The invention further includes the following novel features and details of construction, to be hereinafter more fully described and illustrated in the accompanying drawings.

In the drawings:

Figure 1 is a longitudinal sectional view through a pair of hose coupling members constructed in accordance with the present invention, the members being shown in position prior to coupling.

Fig. 2 is a similar view showing the members coupled.

Fig. 3 is an end view of one of the coupling members.

Referring to the drawings in detail, wherein like characters of reference denote corresponding parts, the coupling comprises a conical casing 10, whose restricted end is connected to and communicates with a short cylindrical section 11. The outer flared end of the conical portion 10 is surrounded by an annular flange 12, the latter extending inwardy from the outer periphery of the coupling.

The short cylindrical section 11 is connected to a cylindrical casing 13, through the medium of a universal joint 14 and the cylindrical casing 13 has formed therein a telescopic joint 15. Disposed upon opposite sides of the joint 15 and surrounding the casing 13, are annular flanges 16, between which is positioned a coil spring 17, which acts to take up impact when the coupling members of adjacent cars are brought together.

Located within the cylindrical casing 13 is a metal pipe 18, one end of this pipe having a flexible section 19, located beyond the end of the cylindrical casing 13. The opposite end of the pipe is connected to a short flexible hose section 20, which communicates with a conical outwardly flared rubber lining 21, located within the conical portion 10 of the coupling. Connected to the outer periphery of the lining 21 is a flexible wall 22, which is provided with a central opening 23. The hose section 20, the lining 21 and the end wall 22 are preferably formed of rubber so as to prevent the passage of air therethrough, the lining 21 and the end wall 22 providing an air chamber 24 within the conical portion 10 of the coupling.

Air is admitted to and cut off from the air chamber 24 through the medium of a valve 25 located in the pipe section 18, the valve stem having connected thereto oppositely extending operating rods 26, which project outward to each side of the cars to provide for manipulating the valve. The coupling has connected to its outer periphery a hook-shaped off-set arm 27, and when two of the coupling members are to be connected together, the said members are turned or revolved in opposite directions, so that the curved arms 27 will engage one behind the other to prevent separation.

Normally the members 22 occupy the position shown in Fig. 1 of the drawings. The coupling is effected by connecting the hook shaped offset arms 27 of each of the coupling members, which are turned or revolved in opposite directions for that purpose. The springs 17 then serve to hold the coupling members engaged, while the air acting upon the walls 22 cause the latter to form a pressure packing for the joint.

When the coupling members are secured together air is admitted to the air chambers 24 through the valves 25, the air filling the chambers 24 and forcing the end walls 22 of adjacent air chambers tightly together, so that an absolute leak-proof joint is provided.

The invention is susceptible of various changes in its form, proportions and minor details of construction and the right is herein reserved to make such changes as properly fall within the scope of the appended claim.

Having described the invention, what is claimed is:

An air hose coupling for train lines comprising a casing having a flared outer end and a restricted inner end to provide a conical air chamber, said chamber communicating with a cylindrical extension, a flexible end wall for the outer end of the chamber, said end wall having an opening therein, a rubber lining for said air chamber, a pipe connected to the inner restricted end of the rubber lining and communicating with the air supply, a casing surrounding said pipe, a universal connection between the air chamber and the pipe casing, a telescopic spring controlled joint in said pipe casing, a cut off valve for controlling the admission of air to the air chamber from the train line and means for locking the coupling members together.

In testimony whereof I affix my signature.

ELVIN MACE STOUT.